3,097,201
SUBSTITUTED SULFATHIAZOLES

Ferdinand B. Zienty, Warson Woods, Mo., assignor to Monsanto Chemical Company, St. Louis, Mo., a corporation of Delaware
No Drawing. Filed Oct. 21, 1960, Ser. No. 63,964
7 Claims. (Cl. 260—239.95)

This invention relates to a new class of substituted sulfathiazoles having useful properties as are hereinafter described. More particularly the invention is directed to condensing N'-2-thiazolesulfanilamides and related compounds with dibasic acid anhydrides.

Suitable sulfathiazoles are those of the structure

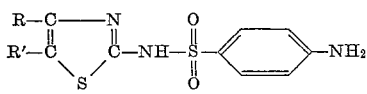

wherein R and R' are hydrogen or alkyl radicals having up to four carbon atoms which readily condense with acid anhydrides of the structure

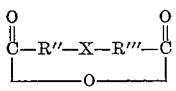

wherein X is selected from the group consisting of sulfur and oxygen and wherein R" and R''' are alkylene radicals of up to four carbon atoms. The products prepared by this reaction have the structure:

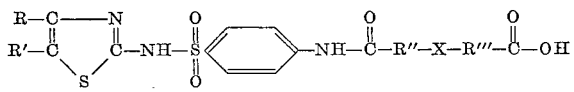

However if the synthesis involves a final step in the presence of an alkaline medium; for example, an alkali metal hydroxide, such as, sodium hydroxide and potassium hydroxide; an alkaline earth metal hydroxide, such as calcium hydroxide; and ammonium hydroxide, compounds of the following structure are prepared,

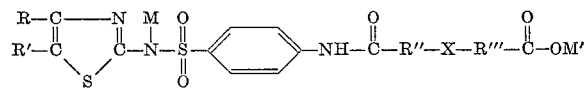

wherein M and M' are the alkali metal or alkaline earth metals or the ammonium radical.

Suitable N'-2-thiazolsulfanilamides are the unsubstituted compounds and those having alkyl substituents replacing the hydrogen atoms of the heterocyclic ring. The alkyl substituents may be methyl, ethyl, isopropyl, n-propyl, n-butyl, isobutyl, and t-butyl radicals.

The useful dicarboxylic acid anhydrides are those with oxy or thio groups in the carbon chain between the carbonyl groups, for example diglycolic acid anhydride, thiodiacetic anhydride, oxaadipic acid anhydride, thiaadipic acid anhydride, oxapimelic acid anhydride, thiapimelic acid anhydride, oxasuberic acid anhydride, thiasuberic acid anhydride, oxaazelaic acid anhydride, thiaazelaic acid anhydride, oxasebacic acid anhydride and thiasebacic acid anhydride.

The dicarboxylic acid anhydrides and the thiazolsulfanilamides are mixed in an organic liquid medium. The reaction is usually exothermic and the mixture will increase in temperature as the reaction proceeds. Moderate heating, for example, to the reflux temperature may be required under some circumstances. The solid product obtained may be separated by filtration and purified by washing with the said organic liquid medium or a similar organic liquid which is a non-solvent for the product. The final separation from impurities may be effected by recrystallization from a solvent such as water of aqueous solutions.

Further details are set forth in the following examples:

Example I

A flask was charged with 50 ml. of anhydrous dioxane, 12.7 g. of sulfathiazole and 6.6 g. of thiodiacetic anhydride at room temperature. In 15 minutes the temperature had increased to 34° C. A gelatinous solid was recovered by filtering the reaction mixture which was washed with anhydrous dioxane and dried at 25° C. The product (M.P. 165–166° C.) produced in substantially a 100 percent yield was identified as a compound of the structure:

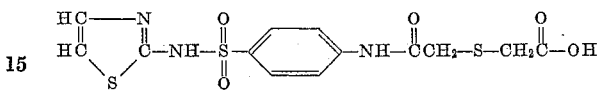

Example II

A flask was charged with 75 ml. of acetone, 25.5 g. of sulfathiazole and 12.0 g. of diglycolic acid anhydride. The reaction mixture was allowed to stand two hours and the solid product separated from the reaction mixture by filtration. The solid product produced in a 96.2 percent yield was recrystallized from water solution (M.P. 179–180° C.). It was identified as a compound of the structure:

Example III

A flask was charged with 250 ml. of an aqueous solution containing 4 g. of sodium hydroxide. To this there was added 38.7 g. of the compound prepared in Example I, producing the monosodium salt. The salt can be used in solution or the water may be evaporated to recover the dry salt.

Example IV

A flask was charged with 150 ml. of an aqueous solution containing 8 g. of sodium hydroxide. To this there was added 38.7 g. and the compound prepared as in Example I, producing the disodium salt. The salt can be used in solution or the water may be evaporated to recover the dry salt.

Example V

A flask was charged with 250 ml. of an aqueous solution containing 4 g. of sodium hydroxide. To this there was added 37.1 g. of the compound prepared in Example II, producing the monosodium salt. The salt can be used in solution or the water may be evaporated to recover the dry salt.

Example VI

A flask was charged with 150 ml. of an aqueous solution containing 8 g. of sodium hydroxide. To this there was added 37.1 g. of the compound prepared in Example II, producing the disodium salt. The salt can be used in solution or the water may be evaporated to recover the dry salt.

Using the procedures described in the specific examples and the proper selection of the dicarboxylic anhydride and sulfathiazoles the following new compounds are synthesized:

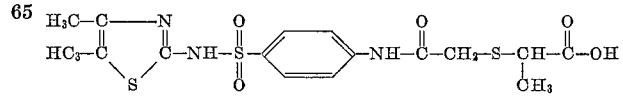

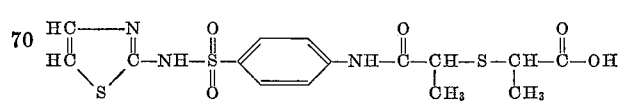

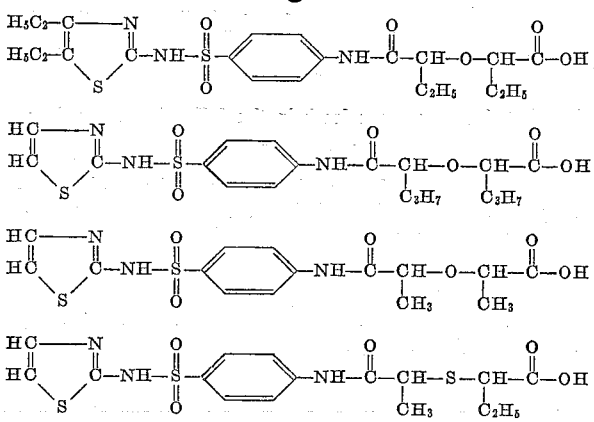

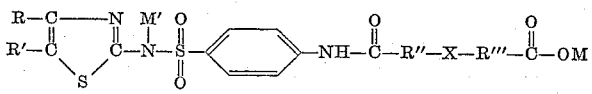

The above described compounds have antioxidant properties when formulated with synthetic rubbers, and neoprene in particular.

The embodiments of the invention in which an exclusive property or privilege is claimed are defined as follows:

1. Compounds of the structure:

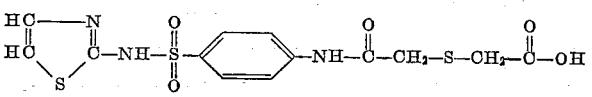

wherein X is selected from the group consisting of sulfur and oxygen; wherein R and R' are each selected from the group of hydrogen and alkyl radicals having up to four (4) carbon atoms, wherein R" and R'" are alkylene radicals having up to four (4) carbon atoms, wherein M and M' are selected from the group consisting of hydrogen, alkali metal atoms, the ammonium radical and half of an alkaline earth metal atom.

2. A compound of the structure:

3. A compound of the structure:

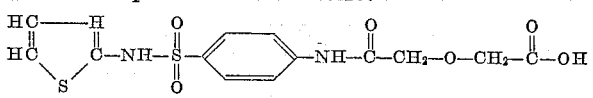

4. A compound of the structure:

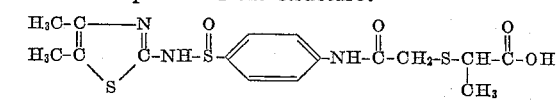

5. A compound of the structure:

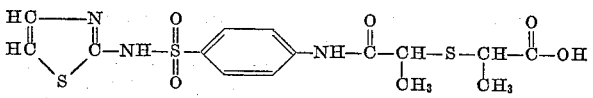

6. A compound of the structure:

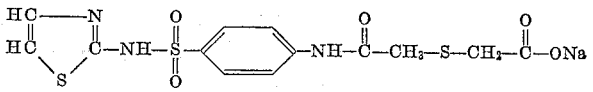

7. A compound of the structure:

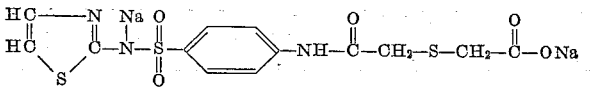

References Cited in the file of this patent
UNITED STATES PATENTS

| | | |
|---|---|---|
| 2,383,859 | Hentrich et al. | Aug. 28, 1945 |
| 2,391,857 | Zienty | Dec. 25, 1945 |
| 2,404,737 | Moore | Jan. 23, 1946 |
| 2,520,293 | Weiss | Aug. 29, 1950 |
| 2,576,825 | Delmar et al. | Nov. 27, 1951 |
| 2,602,085 | Ruskin | July 1, 1952 |

FOREIGN PATENTS

| | | |
|---|---|---|
| 595,038 | Great Britain | Nov. 25, 1947 |
| 665,339 | Great Britain | Jan. 23, 1952 |

OTHER REFERENCES

Lowy et al.: An Introduction to Organic Chemistry, published by John Wiley and Sons, Inc., New York, page 213 (1945).